July 22, 1969  L. C. FLOWERS ET AL  3,457,171
GRAPHITIC OXIDE MEMBRANE FOR DESALINATING WATER
Filed Feb. 13, 1967  2 Sheets-Sheet 1

WITNESSES
Edwin E. Bassler
James T. Young

INVENTORS
Leonard C. Flowers
& Daniel Berg
BY Alex Mich Jr.
ATTORNEY

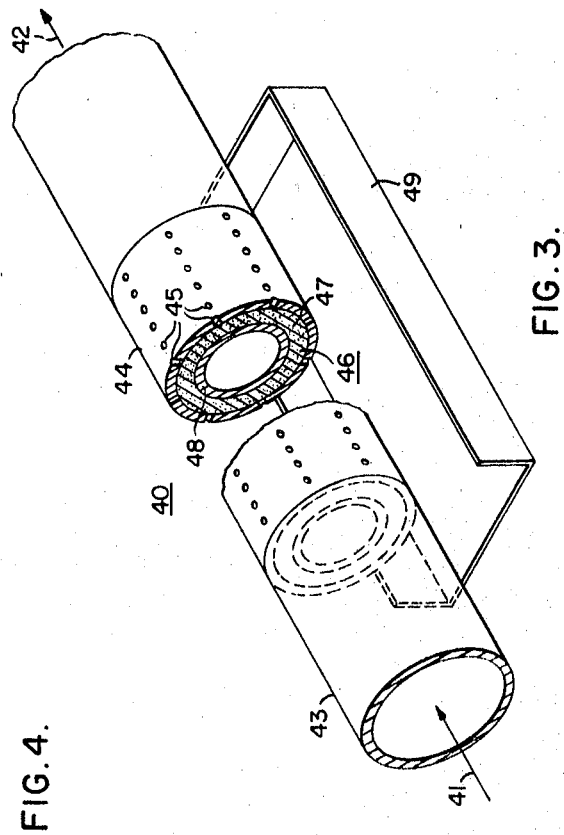

FIG. 3.

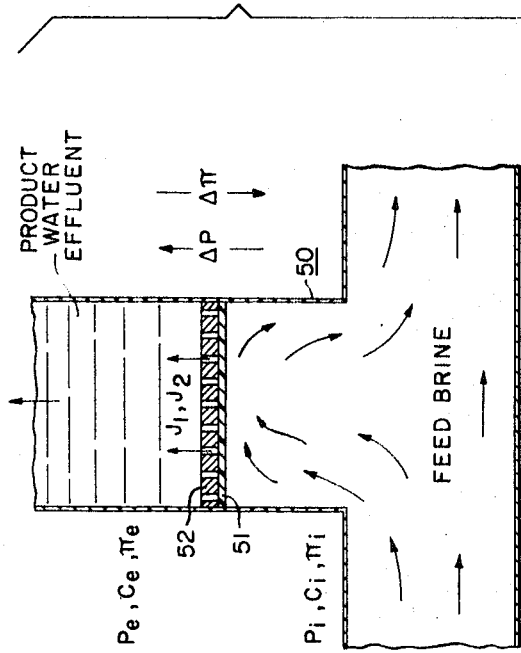

FIG. 4.

$P_i$ = FEED BRINE PRESSURE
$C_i$ = CONCENTRATION OF SALT IN FEED
$\pi_i$ = OSMOTIC PRESSURE OF SALT SOLUTION (FEED)
$P_e$ = EFFLUENT PRESSURE
$C_e$ = CONCENTRATION OF SALT IN EFFLUENT
$\pi_e$ = OSMOTIC PRESSURE OF SALT SOLUTION (EFFLUENT)
$J_1$ = WATER FLUX THROUGH MEMBRANE
$J_2$ = SALT FLUX THROUGH MEMBRANE
$\Delta P$ = PRESSURE DROP, $P_i - P_e$, FEED TO EFFLUENT
$\Delta \pi$ = OSMOTIC PRESSURE DIFFERENCE
$\pi_i - \pi_e$, EFFLUENT TO FEED
$\Delta P - \Delta \pi$ = NET DRIVING PRESSURE United States Patent Office 3,457,171
Patented July 22, 1969

3,457,171
GRAPHITIC OXIDE MEMBRANE FOR
DESALINATING WATER
Leonard C. Flowers, Murrysville, and Daniel Berg,
Pittsburgh, Pa., assignors to Westinghouse Electric
Corporation, Pittsburgh, Pa., a corporation of
Pennsylvania
Filed Feb. 13, 1967, Ser. No. 615,837
Int. Cl. B01d 13/04, 13/00; G02b 1/82
U.S. Cl. 210—23                                17 Claims

ABSTRACT OF THE DISCLOSURE

Graphitic oxide is made by oxidizing graphite flakes. A suspension of the graphitic oxide is deposited on a porous supporting substrate to form a thin continuous film of graphitic oxide. A resinous polymer is employed as a binder for the graphitic oxide film. The supported film is inserted into a reverse osmosis pressure cell. A demineralized water product is obtained.

Background of the invention

This invention relates to an inorganic crystalline membrane that purifies water in the reverse osmosis desalination process, to a process of making the membrane and to desalinating processes and apparatus therefor.

Reverse osmosis as a means for desalting saline water has been studied for some time. The operational simplicity of the process is perhaps its greatest advantage. One merely places a membrane in a cell and passes the saline feed through the cell so that it contacts the membrane. The membrane must be semipermeable, i.e., it must allow water to pass through but little or no salt. A pressure difference between the two sides of the membrane is necessary to have a product flow. The pressure on the feed solution must be sufficient to overcome the mechanical resistance of the membrane and its support and the osmotic pressure difference between the feed and the desalinated product. The necessity for overcoming the osmotic pressure in this process has given it the name "reverse osmosis."

Films made from various resinous polymers have been investigated for efficacy as semi-permeable membranes in the reverse osmosis process. A specially prepared cellulose acetate film has been extensively investigated. The molecules of resinous polymers such as cellulose acetate are complex. The molecules vary widely in size and shape and sometimes in chemical constitution. Any macroscopic specimen of a polymer is heterogeneous to some extent. This is especially true of a polymeric reverse osmosis membrane since the membrane is swollen into a gel by water imbibed therein. Such a gel inherently lacks reproducible uniformity. The efficacy of such membranes may be adversely affected by high feed water pressures because the cellular structure may be at least partially collapsed.

Inorganic crystalline materials should be more uniform in their macroscopic structures than organic polymers. Inorganic materials are generally simple to prepare, are easier to reproduce uniformly and can possess greater physical strength than organic polymers. They would not be extensively affected by a high feed water operating pressure because of their more rigid structure. No inorganic crystalline materials have, heretofore, been known to function as semi-permeable membranes in the reverse osmosis process.

Summary

It is an object of this invention to provide a rigid inorganic crystalline semi-permeable membrane that may be employed in desalinating water.

An object of the invention is to provide a method of preparing an inorganic semi-permeable desalinating membrane.

Another object of the invention is to provide a process and apparatus for desalinating water wherein relatively high feed pressures may be employed without affecting the efficacy of the semi-permeable membrane.

Briefly, the foregoing objects are accomplished by forming a semi-permeable membrane from graphitic oxide. A suspension of graphitic oxide is deposited on a porous substrate and a very thin continuous film is formed. The film thickness is in the order of 25 microns and less. It may be about 0.25 micron thick, for example. With thicker films, there may be no water flow through the film even at very high pressures. The thin films will provide the highest flow rates and are the most desirable.

Brief description of the drawing

For a better understanding of the invention reference may be had to the accompanying drawing in which:

FIG. 3 is a partially sectioned isometric view of a tubular reverse osmosis cell; and FIG. 4 is a schematic illustration of the reverse osmosis desalinating process.

Description of the preferred embodiments

Figure 1:
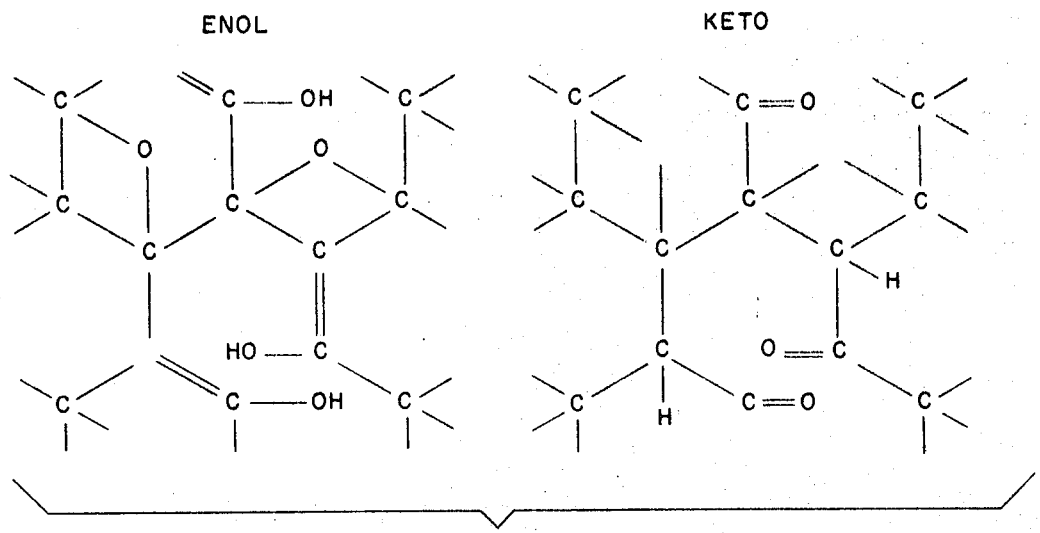
FIGURE 1 is an illustration of the chemical composition of graphitic oxide in keto and enol tautomeric forms.

Graphitic oxide can be made by oxidizing graphite flakes with specific oxidizing mixtures. Even though it is not a well known oxide of carbon, its preparation has been known for some time and is disclosed in the art. Reference may be had to the following technical articles, incorporated herein by reference, for details on the preparation of graphitic oxide: A. Clauss et al., Z. Elektrochem., 61:1284 (1957); W. S. Hummers, Jr. and E. H. Offeman, J. Am. Chem. Soc., 80:1339 (1958); and J. H. De Boer and A. B. C. Van Doorn, "Industrial Carbon and Graphite," Society of Chem. Industry, London, pp. 302–308 (1958). The methods reported in the literature may be classified as the Staudenmaier method and the Hummers and Offeman method. Either of these methods, or indeed other methods, if they are known, may be employed for preparing the graphitic oxide product for the purposes of this invention.

The graphitic oxide product is washed repeatedly to remove traces of the oxidizing acids. The product is centrifuged and a gelatinous liquid containing about 1 to 2% solids and having a pH of about 3 and the consistency of a gear oil is obtained. This viscous suspension is diluted with anywhere from 100 to 1000 volumes of water. Suspensions containing a milligram or less of graphitic oxide per milliliter of suspension are desirable in preparing the desired very thin continuous films. Even with such dilute suspensions, it is advantageous to incrementally add the suspension to the porous substrate to obtain a thin uniform film.

The diluted suspension is, then, added in small increments to a porous substrate having a pressure differential across the thickness of the substrate. The pressure differential is an aid in developing uniform and thin continuous layers of graphitic oxide. The porous substrate may, for example, be conveniently supported in a suction filter that is connected to a water aspirator while the suspension is being added and while the water evaporates. When one recognizes that the thin films are in the order of 0.25 to 25 microns in thickness, it will be appreciated that the pressure imposed on the graphitic oxide deposit is helpful in keeping the deposited particles uniformly distributed during drying. It should also be understood that the thinnest films of graphitic oxide are the most desirable, so long as they are continuous and free of flaws, since the process water flux rate is inversely proportional to the thickness and the salt rejection is essentially independent of thickness.

Although it is not necessary for its efficacy as a semipermeable membrane in the reverse osmosis process, the mechanical strength of the graphitic oxide film may be improved by the addition of a bonding agent. Film-forming organic polymers can be used as binders and polymers which imbibe substantial amounts of water are preferred. Examples of such preferred binders are water insoluble varieties of polyvinyl alcohol, cyaoethylated polyvinyl alcohol, cyanoethyl cellulose, cellulose and cellulose acetates. The graphitic oxide alone is a film former and it should be understood that it alone may be employed as the membrane so long as it is supported by a substrate having adequate mechanical strength and a porosity that will not provide a marked resistance to water flow.

Some difficulty may be encountered in expressing the composition of graphitic oxide as a stoichiometric compound, primarily because it is almost impossible to completely dry the graphitic oxide. The elemental analysis of the material may therefore be complicated by varying traces of water. X-ray patterns of the compound to disclose an ordered lamellar crystal lattice structure of graphite form. The lattice is distorted and the carbon planes in the graphitic oxide structure are believed to be slightly buckled or corrugated. The spacing between the planes of the C atoms increases from 3.4 A. for graphite to 6.35 A. for dry graphitic oxide. The interplanar spacing may increase to about 11.6 A. as the graphitic oxide sorbs water. It is apparent that the interplanar spacing of the planes of the C atoms in graphitic oxide is greater than 3.4 A. units. The chemical compositions of the graphitic oxide in keto and enol tautomeric forms is shown in FIGURE 1. It is apparent that hydrogen is present and is in the hydroxyl of the enol form. The graphitic oxide is, of course, a water insoluble solid oxide of carbon.

The term graphitic oxide is in itself definitive to those skilled in the art. The composition may be calculated and defined, in terms of C:O ratio, not directly from the elemental analysis but after subtracting an amount of oxygen that would be equivalent to $H_2O$, if all the H in the analysis were $H_2O$, even though it is not. In this way, the calculation of the C:O ratio is made independent of the amount of $H_2O$ sorbed and included in the elemental analysis. Graphitic oxides having C:O ratios from about 2.2 to 3.5 have been used to form membranes with some salt rejection properties. Samples having the higher ratios may have contained unoxidized graphite but nonetheless did have the facility of desalinating water.

The following will serve as specific examples of the invention and should not be construed in a limiting sense.

Graphitic oxide was prepared by stirring 2.5 grams of powdered flake graphite (particles less than 44μ) and 1.25 grams of sodium nitrate into 82.5 grams of 66° Bé. technical sulfuric acid. The ingredients were mixed in a one liter container that had been cooled to 0° C. in an ice-bath as a safety measure. While maintaining vigorous agitation, 9.31 grams of potassium permanganate was added to the suspension. The addition was carefully controlled to prevent the temperature from exceeding 20° C.

The ice-bath was removed and the temperature of the suspension was raised to 35±3° C. and so maintained for 30 minutes. Then, 115 milliliters of water were slowly stirred into the paste. Violent effervescence occurred and the temperature increased to 98° C. The diluted suspension was kept at that temperature for 15 minutes, then further diluted to about 350 milliliters with ice-water. That suspension was treated with 3% hydrogen peroxide to reduce the residual permanganate and manganese dioxide to colorless soluble manganese sulfate. The warm suspension was filtered and the filter cake was given a second oxidation in accordance with the foregoing procedure. The second filter cake product was washed many times and then ball milled into a very fine colloidal suspension in water. Sufficient water was employed to provide a suspension containing 0.78 mg. of graphitic oxide per milliliter of suspension.

A membrane was prepared by pouring twenty-five milliliters of the graphitic oxide colloidal suspension, in small increments, over a low porosity cellulose paper disc supported in a suction filter that was connected to a water aspirator. The paper was a highly beaten capacitor-type insulating paper having a thickness of 2 mils. The paper disc had a diameter of 2 inches. The graphitic oxide was deposited on the surface of essentially the entire area of the disc. Very little effluent came through the paper disc but at the end of 24 hours, most of the water was gone, presumably through evaporation. A moist pasty layer of graphitic oxide remained. From the known weight and density of the graphitic oxide and the area of the deposit (20 square centimeters), the thickness of the graphitic oxide was calculated to be about 5 microns on a dry basis.

A sufficient amount of water soluble cyanoethylated polyvinyl resin (containing 2.7% N) was dissolved in water to provide 10 milliliters of a solution containing 0.3% by weight of cyanoethylated polyvinyl alcohol. Then, 1.1 milliliters of a 3% by weight ethyl alcohol solution of hexamethoxy methyl melamine was mixed with the resin solution to serve as a cross-linking agent. The mixture was poured onto the bed of moist graphitic oxide deposited and held on the surface of the filter paper disc supported in the suction filter. Again, the bed appeared to dry by evaporation even though suction was being applied. When the bed had lost its shiny liquid appearance, the composite membrane was removed and baked for 30 minutes in air at 150° C. The baking activated the cross-linking agent and a water insoluble resinous binder was produced. The membrane was immersed in water 5 days before testing with salt water in a reverse osmosis pressure cell.

The cyanoethylated polyvinyl alcohol of the foregoing example may be prepared in the following manner: six hundred sixty-six grams of an aqueous solution containing 1.5 mols of polyvinyl alcohol (Dupont's Elvanol 71–30) is placed in a water bath at 27° C. and stirred at moderate speed while 437 grams (8.25 mols) of acrylonitrile is slowly added. This is followed by the slow addition of 220 grams of a 3% aqueous sodium hydroxide solution (0.165 mol NaOH). Stirring is continued for sixty-five minutes. Glacial acetic acid is then added until pH test paper showed a pH of about 4. The resin content of the reaction mixture at this stage is 76 grams, representing an increase of about 13 percent on the original weight of polyvinyl alcohol taken. On this basis, the polyvinyl alcohol is assumed to be about 11 percent cyanoethylated. This assumption is in reasonable accord with the nitrogen assay on the final purified product, which indicates a degree of cyanoethylation of 9.4 percent.

The reaction mixture was precipitated by pouring slowly into 10.4 liters of denatured alcohol with gentle stirring. The resulting precipitate is a white, fluffy, fibrous material which forms a porous cake on filtering with suction. The porous cake dissolved readily in 1021 milliliters of distilled water, and after one reprecipitation in 8.9 liters of alcohol and again filtering we dried for 63 hours under vacuum at 60° C. The weight of final product recovered was 69 grams. The nitrogen content was about 2.7 percent.

Figure 2:
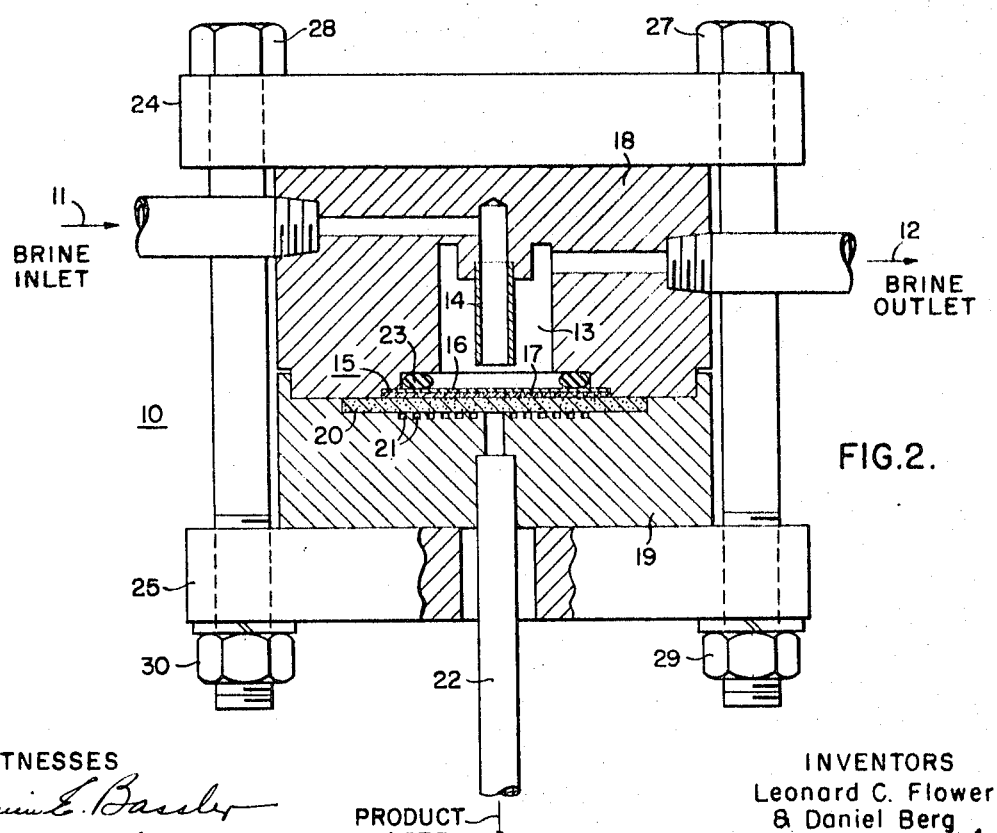
FIG. 2 is a cross-sectional illustration of a flat plate frame type reverse osmosis desalinating cell.

Referring now to FIGURE 2, there is illustrated a desalination cell 10, having a brine inlet 11 and brine outlet 12. The incoming brine is directed into a brine chamber 13 by the tube 14. The membrane 15, described hereinabove, is held between the cell body 18 and the cell cap 19. The thin continuous film 16 is the graphitic oxide layer. A porous substrate 17 and the film 16 comprise the membrane 15. The membrane is supported on a rigid foraminous or porous member 20 which may, for example, be a thin porous sintered metal disc. A plurality of concentric annular water collecting channels 21 are disposed in the cell cap 19. Radial channels (not illustrated) intersect the channels 21 and are connected to the product water outlet 22. The effluent collected in all channels will be directed to the outlet 22. The brine chamber 13 is sealed by the O-ring 23. The end plates 24, 25, the bolts 27, 28 and the nuts 29, 30 serve to hold the cell components together.

Salt water containing 3.5% NaCl, was introduced into the cell, described hereinabove, so that it rapidly circulated over the surface of the membrane at a pressure of 1000 p.s.i. The product water was at essentially atmospheric pressure. The water flux or product emanating from the cell did, of course, pass through the membrane 15. The product water collected over a 24 hour period was 15.6 milliliters which corresponds to a flux or flow rate of 0.65 gallon per square foot per day. The salt rejection, measured by the drop in electrolytic conductance, was about 28 percent. It is apparent from these results that the graphitic oxide membrane is semi-permeable, i.e. that it allows water to pass through while rejecting a large amount of salt.

It should be understood that the graphitic oxide semipermeable membranes may be employed in a plurality of cells, the cells being connected in either series or in parallel. Moreover, the membrane may be employed in other desalination cell configurations. In FIGURE 3, for example, there is illustrated a tubular cell 40, having a brine inlet 41 and a brine outlet 42. The pipe or tube 43 has an intermediate foraminous section 44 with a plurality of holes 45 through its walls so that water may easily emanate from this section. A cylindrical membrane 46 is disposed inside of the foraminous tube section. The membrane has a cylindrical porous substrate 47 with a thin continuous film of graphitic oxide 48 deposited on the inside of the substrate. The foraminous section and membrane constitute a tubular desalinating cell. A trough 49 or other collecting means is disposed below the foraminous section to catch the effluent or product water. Saline water containing 0.1 to 0.7% NaCl is introduced into the inlet 42 at a pressure of about 600 p.s.i. A desalinated product is forced through and flows from the tubular cell.

The essential features of the reverse osmosis desalinating process and the apparatus therefor is illustrated in FIGURE 4. A cell 50 of any desired suitable configuration contains a membrane 51 against a rigid, porous support 52. Feed brine passes through the cell in such a manner that it contacts the membrane before it passes out of the cell. The membrane must be semi-permeable, that is, it must allow water to pass through, but not salt, or at least not very much salt. The product water oozes through the membrane and, as shown, flows out of the cell. The salt content of the inlet brine is $C_i$ and, since no real membrane is perfect, there will also be some salt coming through to the product water to produce a salt concentration $C_e$ in the product. $C_e$, of course, must be very much less than $C_i$. The flow or flux of water through the membrane is labeled $J_1$ and the flow or flux of salt, $J_2$.

A pressure difference between the two sides of the membrane is necessary to cause the water to flow. This is $\Delta P$. This pressure difference must overcome two forces; first the mechanical resistance that is due to restrictions in the membrane structure including the support, and second, the osmotic pressure difference, $\Delta \pi$, which normally would work in the opposite direction, that is, $\Delta \pi$ would cause fresh water above the membrane to flow downward into the feed.

The net driving pressure responsible for the flux, $J_1$ is thus $\Delta P - \Delta \pi$. Usually, the flux comes out essentially at atmospheric pressure and $\Delta P$ can be considered the same value as $P_i$. Also, the osmotic pressure of the product water, $\pi_e$, has to be quite small, so it is often allowable to consider $\Delta \pi$ as being equal to $\pi_i$.

It may be, however, that the salt solution right next to the membrane surface becomes more concentrated than the incoming brine $C_i$. There are two possible reasons for this. One is that the fraction of the water taken off as product water leaves the remainder of the flowing brine more concentrated in salt than it was initially. For example, if the brine initially contained 4.0% salt and if it were possible to take off 50% of the feed as essentially salt-free water, the brine actually at the membrane surface would contain 8% salt. $\Delta \pi$ would then be approximately doubled, and $\Delta P$ would have to be increased to take care of this effect. The other possibility is that a stagnant layer of brine will exist at the membrane surface and will increase greatly in salt content as salt from the effluent is rejected into it. To avoid this concentration build up, it is necessary for the brine to flow rapidly or be agitated in some manner near the membrane surface.

The foregoing concepts can be put into mathematical expressions. For an ideal membrane which does not change its structure or properties with pressure the water flux, $J_1$ is proportional to the pressure gradient:

$$\frac{\Delta P - \Delta \pi}{\Delta X}$$

For a given membrane, $J_1 = A(\Delta P - \Delta \pi$, where A is a so-called membrane constant. The salt flux, $J_2 = B(C_i - C_e)$ where B is a so-called salt permeation constant. It is usually more convenient to speak of salt rejection rather than salt flux. In that case, the salt rejection is equal to:

$$\frac{100 \ (C_i - C_e)}{C_i}$$

as a percentage of incoming salt rejected by the membrane. In which case, the salt rejection percent is equal to:

$$\frac{100}{1 + \frac{B}{A(\Delta P - \Delta \pi)}}$$

A plot (not shown) of these equations leads to a straight line for the variation of the water flux with net driving pressure and to a curve which starts at zero and asymptotically approaches 100% for the change of salt rejection.

It should be noted that the osmotic pressure for typical sea water, containing about 3.45% salt, is about 369 p.s.i. The $\Delta P$ commonly specified for and employed in desalinating such brines is 1500 p.s.i. For saline water in the brackish range, i.e. containing 0.1 to 0.7% of salt, the osmotic pressures are much lower, and the applied pressure is commonly 600 p.s.i.

It should be apparent that the apparatus and method for desalinating water by at reverse osmosis process generally requires means for supplying and removing a supply of saline water to one surface or side of an appropriate semi-permeable membrane. The saline water should circulate across the surface at a pressure at least sufficient to overcome the difference in osmotic pressure and any mechanical resistance to flow from the membrane surface to the product collecting means. The pressure will force a water product through the membrane. Since the water flux is much greater than the salt flux through a satisfactory membrane, the concentration of the salt in the product will be lower than in the saline water feed. Rapid circulation across the surface of the membrane is desirable to limit or prevent a high salt concentration of the water at the surface.

In relation to the graphitic oxide film, it should be appreciated that the continuous coherent film is derived from the fine particles or lamellae that are suspended in the water carrier. The fine particles may possibly form satisfactory suspensions with other liquids. It is desirable to have as uniform a suspension as possible in order to form a uniform film. It is important to have a uniform film in order to eliminate the possibility of local stress concentrations that may result in film failures at the relatively high operating pressures. The pressure differential across the membrane, with the higher pressure on the graphitic oxide side of the membrane, is an important aid in maintaining a uniform distribution of particles while the water carrier is being removed. The maintenance of a coherent mass diminishes or eliminates the risk of obtaining a fractured or discontinuous product on the porous substrate. In the case of the cylindrical membrane, it may be useful to employ centrifugal force to deposit the graphitic oxide on the porous substrate.

The porous substrate is not directly involved in the desalination process. That function is exclusively performed by the graphitic oxide film. The risk of destroying the continuity of the thin, fragile graphitic oxide film in peel-risk of obtaining a fractured or discontinuous product on merely employing the composite structure. The mechanical strength of the substrate also reduces the risk of damaging the graphitic oxide film both in handling and in the cell where high pressures are imposed. The porous substrate must, of course, be capable of retaining the fine graphitic oxide particles of the suspension on or at its surface. Since a low resistance to fluid flow is a desirable property for the substrate in the cell, it should have as high a porositiy as possible while maintaining the essential particle retention properties. Filter papers or filters such as the high porosity polymeric films with a pore size in the order to 100 angstroms are suitable substrates.

While the foregoing description is primarily directed to desalinating water, it should be understood that the invention is not limited thereto. The invention may, for example, be employed in separating salt from solutions where the salt and not the solvent is the desired product.

What is claimed is:

1. A semi-permeable membrane for use in a reverse osmosis desalination cell comprising a porous substrate and a thin continuous film of graphitic oxide having a thickness not greater than about 25 microns deposited on the substrate.

2. The membrane of claim 1 wherein the film of graphitic oxide has a thickness in the range of about 0.25 to 25 microns.

3. The membrane of claim 1 wherein the graphitic oxide has a C:O ratio of about 2.2 to 3.5.

4. The membrane of claim 1 wherein said thin continuous film comprises a water insoluble solid oxide of carbon having a distorted lamellar crystal lattice of graphite form wherein the interplanar spacing of the planes of the C atoms is greater than 3.4 A. units.

5. The membrane of claim 1 wherein the continuous film is a combination of the graphitic oxide and a water insoluble binder.

6. The membrane of claim 5 wherein the binder is a water insoluble resinous polymer.

7. The membrane of claim 6 wherein the resinous polymer is a polymer which will imbibe water.

8. A desalination cell, comprising a film containing graphitic oxide, a chamber communicating with the graphitic oxide film, means for supplying and means for removing a flow of pressurized saline water to and from said chamber, said supply and removal means adapted to circulate the supply of pressurized saline water over the graphitic oxide film and means for collecting water emanating from said film.

9. The combination of claim 8 wherein said graphitic oxide film has a thickness not greater than about 25 microns.

10. The combination of claim 9 wherein the graphitic oxide is combined with a water insoluble binder.

11. In a reverse osmosis saline water purification process wherein the saline water is circulated over the surface of one side of a semi-permeable membrane at a pressure sufficient to overcome the osmotic pressure across the membrane and the mechanical resistance of the membrane, thereby forcing a water product through said membrane, said water product emanating from another side of said membrane with a lower saline concentration, the improvement which comprises circulating the saline water over the surface of a membrane comprising a graphitic oxide film.

12. The process of claim 11 wherein the graphitic oxide has a C:O ratio in the range of about 2.2 to 3.5 and the film thickness is not greater than about 25 microns.

13. The process of claim 11 wherein the saline water is circulated rapidly over the surface of the film to limit the salt concentration of the water at said surface.

14. The process of claim 11 wherein the saline water is circulated at a pressure of at least 600 p.s.i.

15. The process of claim 11 wherein the saline water is circulated at a pressure of at least about 1500 p.s.i.

16. The process of claim 11 wherein said film comprises a water insoluble solid oxide of carbon having a distorted lamellar crystal lattice of graphite form wherein the interplanar spacing of the planes of the C atoms is greater than 3.4 A.

17. The process of claim 16 wherein the film thickness is in the range of about 0.25 to 25 microns.

References Cited

UNITED STATES PATENTS

| | | | |
|---|---|---|---|
| 2,682,686 | 7/1954 | Mrozowski | 210—510 X |
| 3,170,867 | 2/1965 | Loeb et al. | 210—500 X |
| 3,283,813 | 11/1966 | Brownscombe et al | 210—22 X |
| 3,283,813 | 11/1966 | Brownscombe et al. | 210—22 X |
| 3,332,815 | 7/1967 | Havens | 156—175 |
| 3,344,928 | 10/1967 | Kraus et al. | 210—22 X |
| 3,373,056 | 3/1968 | Martin | 210—23 X |

OTHER REFERENCES

Boehm et al.: "Graphite Oxide and Its Membrane Properties," from Journal of Chimie Physique, vol. 58, No. 1, 147 pp., pp. 141–147, January 1961.

Marcinkowsky et al.: "Hyperfiltration Studies, IV Salt Rejection by Dynamically Formed Hydrous Oxide Membranes," from Journal of the American Chemical Society, vol. 88, No. 24, Dec. 20, 1966, pp. 5744–5746.

Von K. H., Hellwege: "Membrane Aus Graphitoxyd für Osmostische Messungen," from Kolloid Zeitschrift, vol. 174, No. 1, 96 pp. 46–50, January 1961.

REUBEN FRIEDMAN, Primary Examiner

FRANK A. SPEAR, Jr., Assistant Examiner

U.S. Cl. X.R.

210—321, 500, 506